(12) United States Patent
Tsurumaru et al.

(10) Patent No.: US 6,290,529 B1
(45) Date of Patent: *Sep. 18, 2001

(54) ADAPTER FOR TERMINAL UNIT

(75) Inventors: Shinichiro Tsurumaru, Kawasaki; Mitsuaki Kumagai, Inagi; Takao Obata, Inagi; Toshiyuki Kobayashi, Inagi; Toshikazu Minegishi, Inagi, all of (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/044,029

(22) Filed: Mar. 19, 1998

(30) Foreign Application Priority Data

Sep. 30, 1997 (JP) .................................................. 9-267114

(51) Int. Cl.$^7$ ...................................................... H01R 13/64
(52) U.S. Cl. ............................................ 439/374; 439/620
(58) Field of Search ................................. 439/374, 376, 439/527, 532, 542, 545, 549, 559, 574, 575, 576, 571, 620; 364/708.1; 361/680, 692.5, 699

(56) References Cited

U.S. PATENT DOCUMENTS

| 5,517,683 | * | 5/1996 | Collett et al. ........................... 455/89 |
| 5,745,579 | * | 4/1998 | Newman ................................. 380/52 |
| 5,752,205 | * | 5/1998 | Dzung et al. ......................... 455/572 |
| 5,859,628 | * | 1/1999 | Ross et al. ............................ 345/173 |

* cited by examiner

*Primary Examiner*—Lincoln Donovan
(74) *Attorney, Agent, or Firm*—Armstrong, Westerman, Hattori, McLeland & Naughton, LLP

(57) ABSTRACT

An adapter, for a terminal unit, comprising a base housing having a mount surface for mounting of a terminal unit. A receptive space is defined by a plurality of walls on a part of the mount surface. A pair of guide rails are formed on the mount surface of the base housing, so as to be slidably engaged with the terminal unit. Overhanging guide plates extending from opposed side walls have edges facing to the mount surface, so as to be slidably engaged with the terminal unit. The guides rails and the edges serve to guide the terminal unit to introduce a part of the terminal unit into the receptive space. A pair of protrusions are formed on the mount surface, so as to be engaged with the terminal unit. The protrusions serve to detachably hold the terminal unit in a proper position on the mount surface to maintain the functional connection between the adapter and the terminal unit.

15 Claims, 10 Drawing Sheets

ADAPTER FOR TERMINAL UNIT

BACKGROUND OF THE INVENTION

1. Field of the Invention

The present invention relates generally to a connecting device, or adapter, onto which an electrical unit is detachably mounted and, more particularly, to an adapter to which a portable terminal unit is electrically and/or optically connected. Also, the present invention relates to a connecting structure comprising adapters ard terminal units.

2. Description of the Related Art

Portable terminal units have been used for temporarily storing data regarding, for example, stock management in a store or a gas or electric power consumption of a user. Also, an adapter is known in the art which is effectively used in association with such a terminal unit to transmit data stored in the terminal unit through the adapter to a host computer.

FIGS. 1A to 1C show a conventional portable terminal unit 1 and a conventional adapter 5 used for the terminal unit 1. As shown in FIG. 1A, the terminal unit 1 includes a keyboard 2 for data input and a display 3 such as a liquid crystal display, both arranged on a front face of the terminal unit 1. The terminal unit 1 is also provided on the bottom end thereof with a pair of battery charging contacts 4, and on the back face thereof, opposed to the front face, with an optical interface (not shown) for data communication.

On the other hand, the adapter 5 includes a housing 6 having a generally rectangular mount surface and a plurality of guide walls 10, 11, provided respectively along longitudinally extending two edges (i.e., side edges) and laterally extending one edge (i.e., a bottom edge) of the mount surface to uprightly project from the mount surface, for guiding and positioning the terminal unit 1 in a proper position on the mount surface. The mount surface of the housing 6 and the inside surfaces of the guide walls 10, 11 define a receptive space 7 for detachably receiving the terminal unit 1 in the proper position.

The adapter 5 is also provided on the mount surface with an optical interface 8, and on the inside surface of the bottom guide wall 11 with a pair of battery charging contacts (not shown), both being aligned respectively with the optical interface and the battery charging contacts 4 of the terminal unit 1 received in the proper position. The adapter 5 further includes a foot 9 extending from the back side of the housing 6 to permit the adapter 5 to be placed with a certain inclination on a flat horizontal surface, such as a table surface, and to facilitate the mounting operation of the terminal unit 1 into the receptive space 7.

In the normal mounting operation of the terminal unit 1 on the adapter 5, the unit 1 is first incompletely placed on the mount surface of the housing 6 and is then slid thereon in a direction Y (FIG. 1A) into the proper position under the guiding function of the side guide walls 10. In this respect, the terminal unit 1 is covered on the outer peripheral region thereof with a rubber material to provide shock resistance, water resistance and an improved feel, as is commonly provided in most conventional terminal units. Therefore, it is difficult to smoothly slide the terminal unit 1 on the mount surface between the side guide walls 10 due to a relatively large friction between the surfaces of the rubber material and guide walls 10.

Also, in the conventional adapter 5, the terminal unit 1 is fully received in the proper position when the bottom end of the unit 1, on which the battery charging contacts 4 are provided, comes into abutment with the inside surface of the bottom wall 11. In this respect, it is difficult for an operator to sense the abutment between the terminal unit 1 and the bottom wall 11, and to confirm that the terminal unit 1 is fully received in the proper position.

Further, the terminal unit 1 relatively easily falls out of the receptive space 7 in the adapter 5 because the terminal unit 1 is held in its proper position mainly by gravity. This will happen, for example, when the terminal unit 1 is carelessly mounted on the adapter 5, when the protruding top end of the unit 1 incompletely placed on the mount surface of the housing 6 is inadvertently pushed down, or when an optional unit is additionally attached to the top end of the unit 1.

FIGS. 2A to 3B show certain modifications to the conventional adapter 5. In the modification of FIGS. 2A and 2B, the adapter 5 is provided with an overhanging guide wall 13 for holding the bottom end of the terminal unit 1, and a battery charging contact 14 is fixedly arranged on the mount surface of the housing 6. When the terminal unit 1 is slid on the mount surface in a mounting or detaching operation, a problem arises in that the tip end of the contact 14 may be engaged with the back face of the terminal unit 1 so that the contact 14 is inadvertently deformed or broken.

On the other hand, in the modification of FIGS. 3A and 3B, a battery charging contact 14 is fixedly arranged on the inside surface of the bottom wall 11. When the terminal unit 1 is slid along the inside surface of the bottom wall 11 in a mounting or detaching operation, a problem also arises in that the tip end of the contact 14 may be engaged with the bottom end of the terminal unit 1 so that the contact 14 is inadvertently deformed or broken.

SUMMARY OF THE INVENTION

It is therefore an object of the present invention to provide an adapter, for use with a terminal unit, which can facilitate the mounting operation of the terminal unit on the adapter, even when the terminal unit is covered on its outer periphery with a rubber material.

Another object of the present invention is to provide an adapter, for use with a terminal unit, which can securely hold the terminal unit in a proper position on the adapter, irrespective of the direction of the force of gravity applied to the terminal unit.

A further object of the present invention is to provide an adapter, for use with a terminal unit, which enables an operator to readily sense and confirm that the terminal unit is located in a proper position on the adapter.

A still further object of the present invention is to provide an adapter, for use with a terminal unit, which can prevent a battery charging contact provided in the adapter from being deformed or broken during a mounting or detaching operation of the terminal unit.

In accordance with the present invention, there is provided an adapter, for a terminal unit, comprising a base housing having a mount surface for mounting a terminal unit; a plurality of walls provided on the base housing to define a receptive space on a part of the mount surface of the base housing; guide means for guiding the terminal unit to introduce a part of the terminal unit into the receptive space; an interface section provided on the base housing for functional connection with the terminal unit; and holding means for detachably holding the terminal unit in a proper position on the mount surface to maintain the functional connection.

In the preferred aspect of the invention, the guide means includes at least one guide rail formed on the mount surface of the base housing, the guide rail being adapted to be slidably engaged with the terminal unit.

In this arrangement, the guide means may further include an edge of at least one of the walls, the edge facing the mount surface and being adapted to be slidably engaged with the terminal unit.

In another preferred aspect of the invention, the holding means includes an edge of at least one of the walls, the edge facing the mount surface and being adapted to be engaged with the terminal unit.

It is advantageous that the holding means further includes at least one protrusion formed on the mount surface, the protrusion being adapted to be engaged with the terminal unit.

In this arrangement, the holding means may further include a surface of another one of the walls, the surface being adapted to be abutted with the terminal unit to hold the terminal unit in cooperation with the protrusion.

Also, the holding means may further include at least one guide rail formed on the mount surface of the base housing, the guide rail being adapted to be engaged with the terminal unit.

It is further preferred that the holding means includes a supporting mechanism detachably supporting the terminal unit on the mount surface, the supporting mechanism including an additional wall arranged opposite to the receptive space on the mount surface and a rolling element retractably projecting toward the receptive space from the additional wall.

In this arrangement, the supporting mechanism may further include a shiftable member arranged within the base housing, the shiftable member carrying at one end thereof the rolling element in a rotatable manner and at another end thereof a push part accessively disposed on the base housing.

Advantageously, the shiftable member is made from a plate spring.

Also, the supporting mechanism may further include shock absorbing elements affixed respectively onto mutually opposed surfaces of the additional wall and one of the walls.

In a further preferred aspect of the invention, the interface section includes an optical interface for communication.

In a still further preferred aspect of the invention, the interface section includes a battery charging contact.

It is advantageous that the battery charging contact is retractably arranged in one of the walls defining the receptive space, and wherein a lever, carrying at one end thereof the battery charging contact, is pivotably supported within the base housing, the lever having another end retractably projecting from the mount surface when the battery charging contact is retracted into the one wall.

In this arrangement, the adapter may further comprise a switch mechanism arranged in the base housing for detecting a placement of the terminal unit in the proper position, the switch mechanism being actuated by the lever.

In a yet further preferred aspect of the invention, the adapter further comprises a switch mechanism arranged in the base housing for detecting a placement of the terminal unit in the proper position.

In this arrangement, the switch mechanism may include an actuating lever pivotably supported within the base housing for actuating the switch mechanism, the actuating lever having one end capable of retractably projecting from the mount surface.

The present invention also provides a connecting structure, comprising an adapter and a terminal unit, wherein the terminal unit includes: a body; a data input section accessively provided on the body; an interface section accessively provided on the body separately from the data input section; and a protective cover attached to an outer peripheral area of the body; and wherein the adapter includes: a base housing having a mount surface; a plurality of walls provided on the base housing to define a receptive space on a part of the mount surface of the base housing; guide means arranged to be slidably engaged with a portion, separated from the protective cover, of the base of the terminal unit, for guiding the terminal unit to introduce a part of the terminal unit into the receptive space; an interface section provided on the base housing to provide a functional connection with the interface section of the terminal unit; and holding means for detachably holding the terminal unit in a proper position on the mount surface to maintain the functional connection.

BRIEF DESCRIPTION OF THE DRAWINGS

The above and other objects, features, and advantages of the present invention will become more apparent from the following description of the preferred embodiments in connection with the accompanying drawings, in which.

DESCRIPTION OF THE PREFERRED EMBODIMENT

Figure 1B:
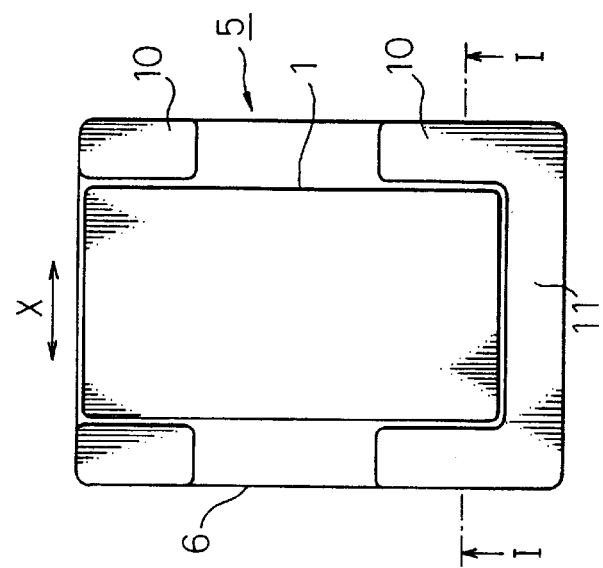
FIG. 1B is a plan view of the adapter and the terminal unit shown in FIG. 1A, with the terminal unit being received in the adapter.
Figure 1C:
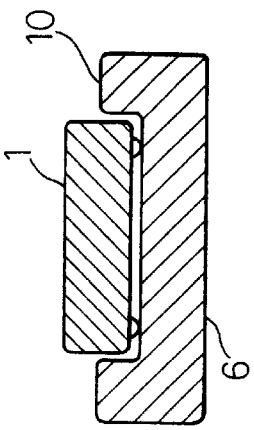
FIG. 1C is a sectional view taken along line I—I in FIG. 1B.
Figure 1A:
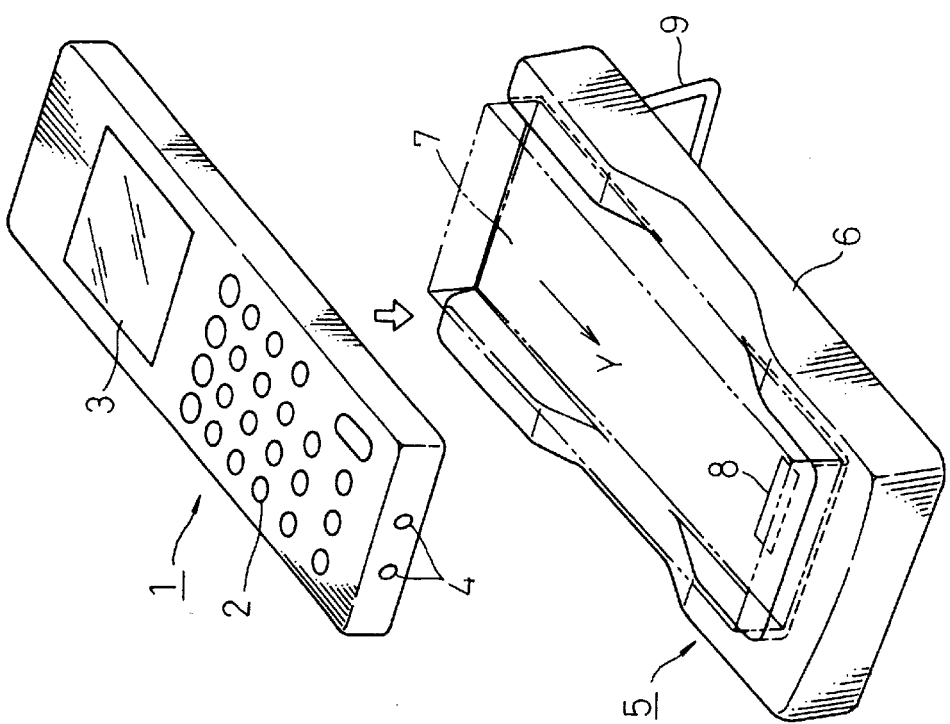
FIG. 1A is a perspective view showing a conventional adapter and a conventional terminal unit, with the terminal unit being detached from the adapter.
Figure 2A:
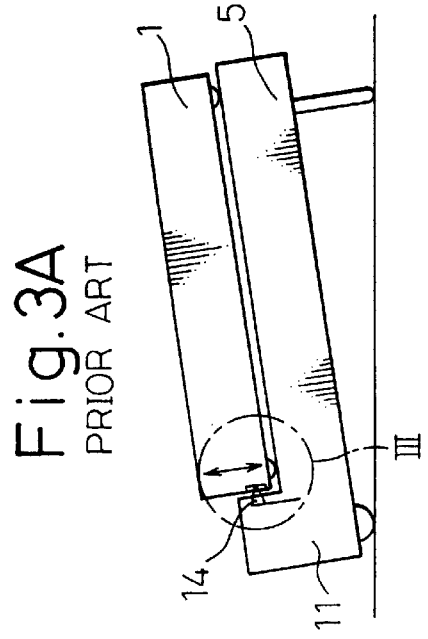
FIG. 2A is a schematic illustration for clarifying a problem of a conventional adapter.
Figure 2B:
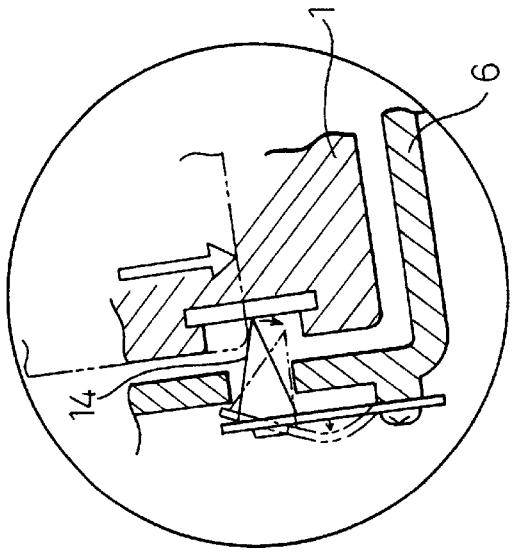
FIG. 2B is an enlarged partial sectional view showing an encircled portion II in FIG. 2A.
Figure 3A:
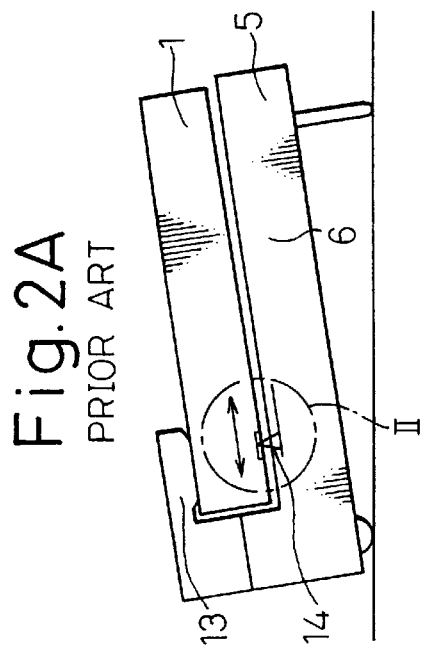
FIG. 3A is a schematic illustration for clarifying a problem of another conventional adapter.
Figure 3B:
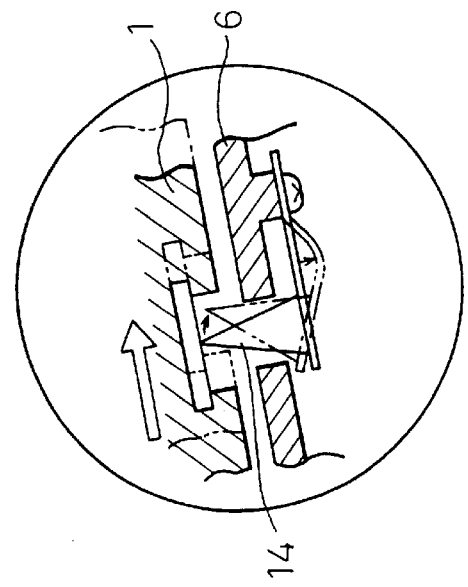
FIG. 3B is an enlarged partial sectional view showing an encircled portion III in FIG. 3A.

Referring now to the drawings, in which the same or similar components are denoted by the same reference numerals, FIGS. 4A through 7B show an adapter according to the first embodiment of the present invention. The adapter 22 of this embodiment is shown as a communication adapter used for a portable terminal unit 20 to transmit data stored in the terminal unit 20 through the adapter 22 to a host computer (not shown). The adapter 22 also can charge a built-in battery (not shown) of the terminal unit 20.

Figure 4B:
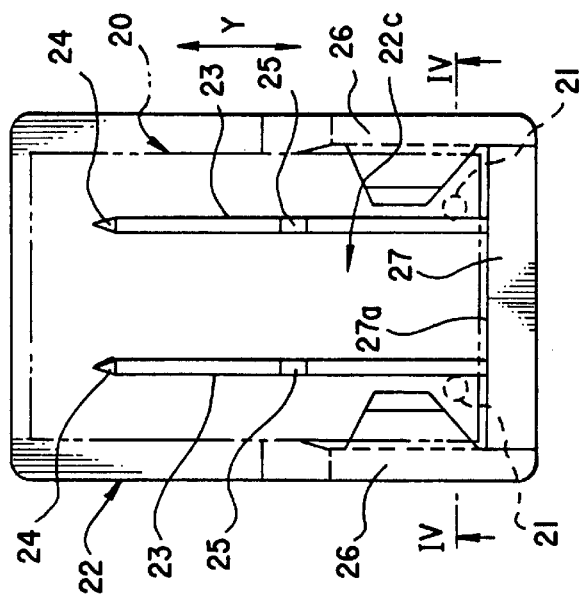
FIG. 4B is a plan view of the adapter of FIG. 4A, with a terminal unit adapted to be received in the adapter being shown by a chain line.
Figure 4C:
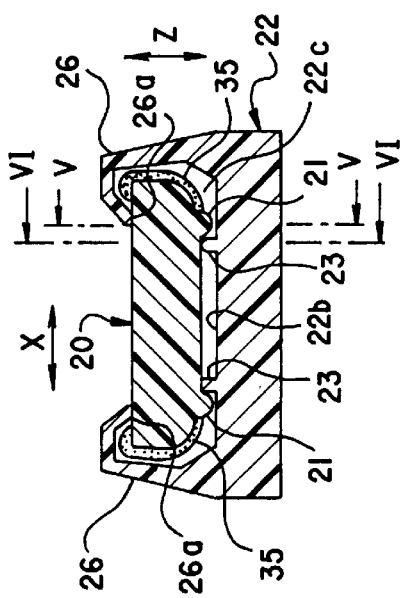
FIG. 4C is a sectional front view of the adapter taken along line IV—IV of FIG. 4A, with a portable terminal unit being received in the adapter.
Figure 4A:
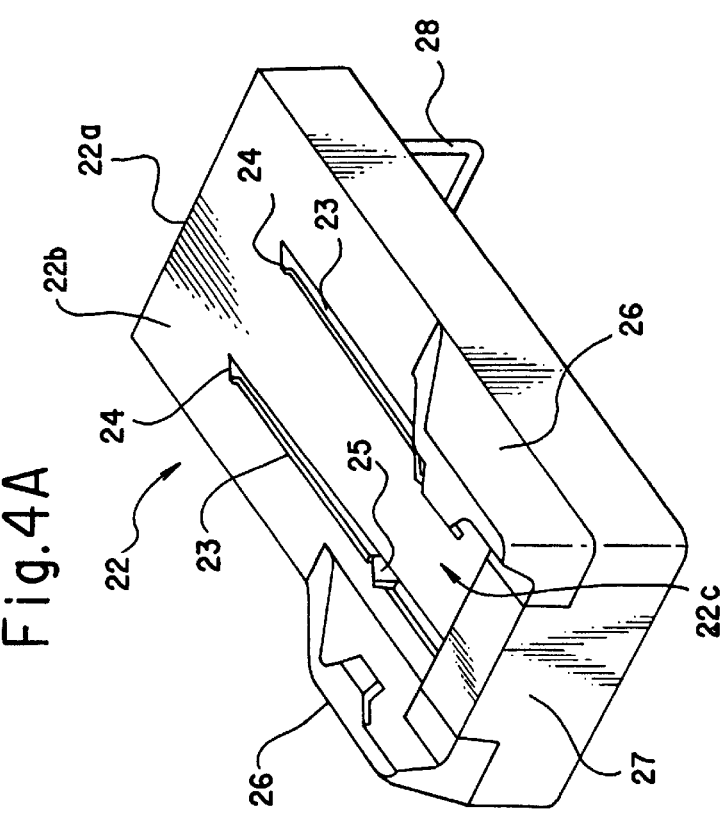
FIG. 4A is a perspective view showing a first embodiment of an adapter according to the present invention.
Figure 5:
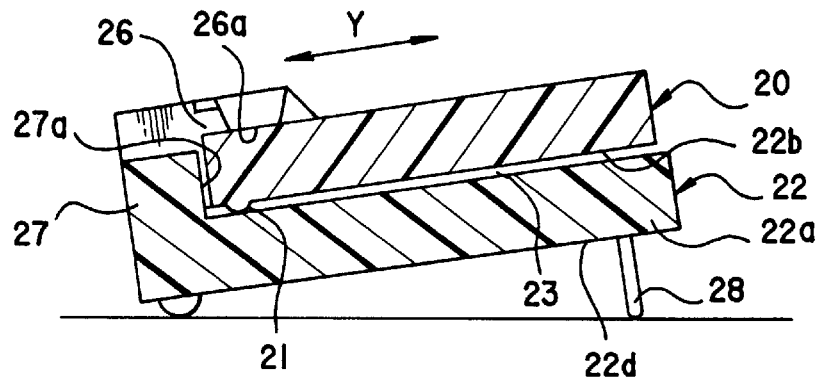
FIG. 5 is a schematically sectional side view taken along line V—V in FIG. 4C.

As shown in FIG. 4A, the adapter 22 includes a generally rectangular parallelepiped base housing 22a having a mount or front surface 22b on which the terminal unit 20 is mounted. A pair of guide rails 23 is formed on and projects from the front surface 22b of the base housing 22a. The guide rails 23 extend in parallel to each other and in a longitudinal direction of the base housing 22a. As illustrated, the guide rails 23 are positioned between, and offset from, side walls 26. One longitudinal end of each rail 23 is spaced from laterally extending one edge (i.e., a top edge) of the front surface 22b of the base housing 22a, and is provided integrally with a generally triangular protrusion 24. Each rail 23 is also provided, at a longitudinal midway portion thereof, with a through hole penetrating a wall of the base housing 22a, through which a first end 25 of a lever 31 (FIG. 7A) projects from the rail 23. The function of the lever 31 is described later.

The adapter 22 also includes two side walls 26 provided respectively along two longitudinally extending edges (i.e., side edges) of the front surface 22b of the base housing 22a to uprightly project from the front surface 22b, and a bottom wall 27 provided along laterally extending another edge (i.e., a bottom edge) of the front surface 22b of the base housing 22a to uprightly project from the front surface 22b. The side walls 26 extend from a longitudinal midway portion of the front surface 22b to the bottom edge thereof, and are connected to the bottom wall 27 to define a receptive space 22c for detachably receiving the terminal unit 20 between the inner surfaces of the walls 26, 27 and the front surface 22b of the base housing 22a.

Figure 10:
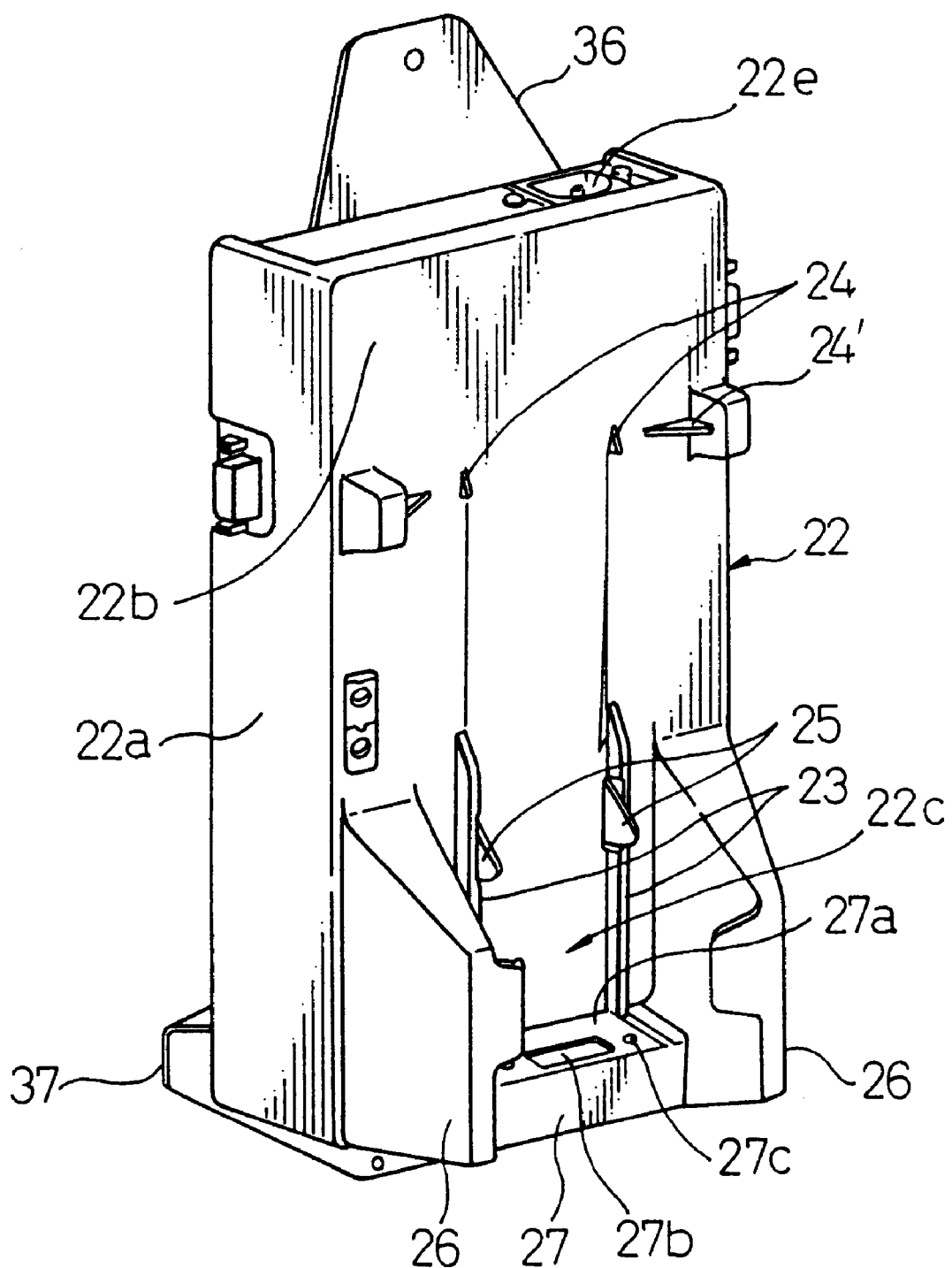
FIG. 10 is a perspective view of the adapter of FIG. 9.

Each side wall 26 is provided with an overhanging guide plate integrally extending from the free end of the side wall 26 into the receptive space 22c. A free edge 26a of each guide plate faces toward the front face 22b of the base housing 22a. The bottom wall 27 is provided, on the inner surface 27a thereof, with an optical interface (an optical interface 27b in a second embodiment is shown in FIG. 10) and a pair of battery charger openings 27c (FIG. 7B). The adapter 22 is also provided with a foot 28 extending from a back side 22d of the base housing 22a. The foot 28 serves to permit the adapter 22 to be placed with a certain inclination on a flat horizontal surface, such as a table surface, in such a manner that the top edge of the front surface 22b is higher than the bottom edge of the latter.

Figure 7B:
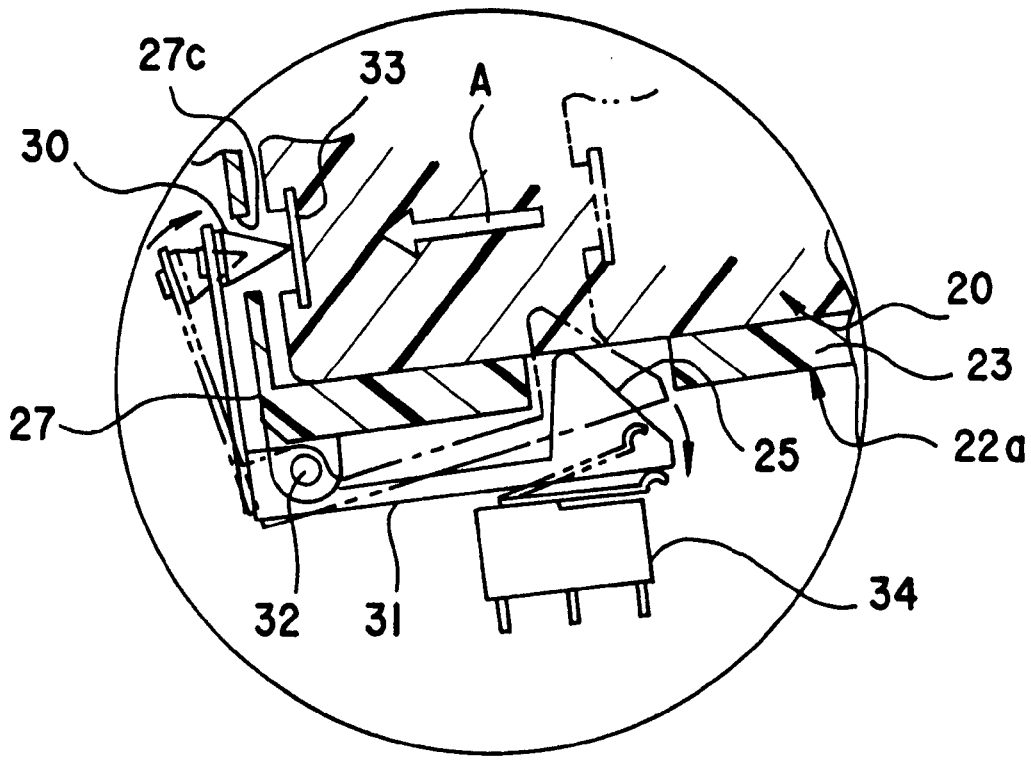
FIG. 7B is an enlarged partial sectional view of the adapter and the terminal unit of FIG. 7A.
Figure 8A:
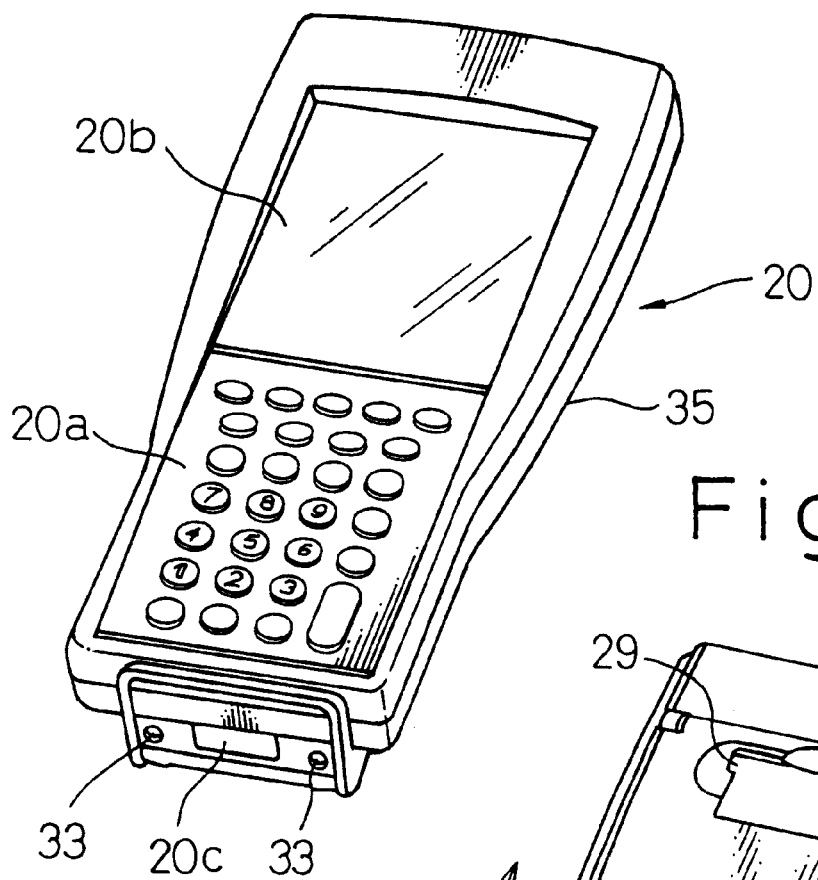
FIG. 8A is a perspective view showing a front face of a terminal unit which may be used in association with the adapter according to the present invention.
Figure 8B:
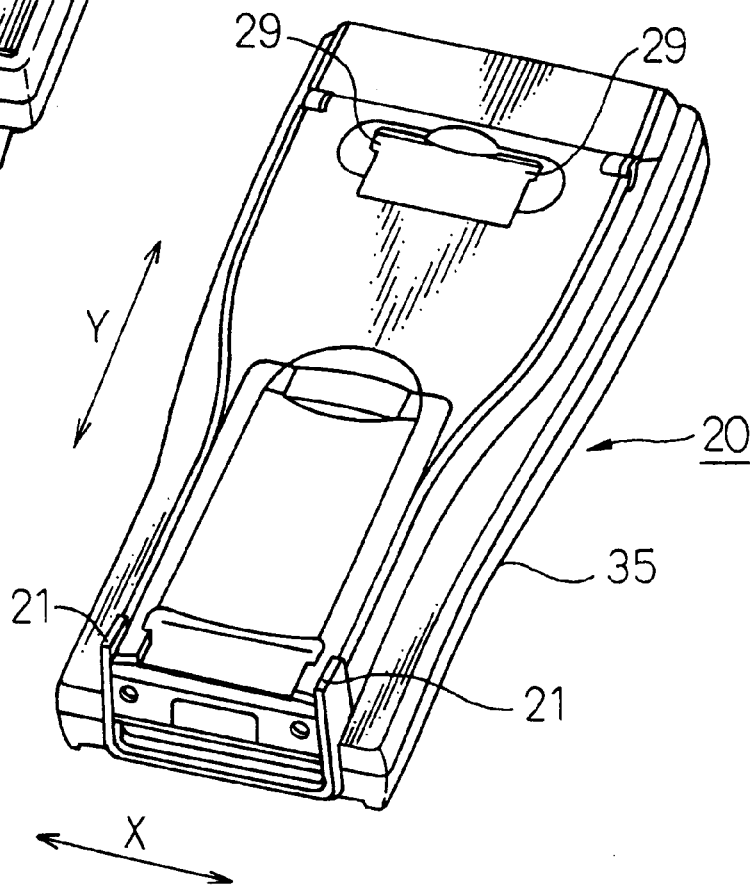
FIG. 8B is a perspective view showing a back face of the terminal unit of FIG. 8A.

FIGS. 8A and 8B show the portable terminal unit 20 which can be used in association with the adapter 22 according to the present invention. As shown in FIG. 8A, the terminal unit 20 includes, on the front face thereof, a keyboard 20a and a display 20b, and is used for temporally storing data regarding, e.g., stock management in a store or a gas or electric power consumption of a user. The terminal unit 20 is also provided on the bottom end thereof with an optical interface 20c adapted to be optically connected to the counterpart optical interface 27b of the adapter 22, and a pair of plate-shaped contact elements 33 (FIG. 7B) adapted to be electrically connected to respective counterpart pin-shaped contact elements 30 (FIG. 7B) of the adapter 22. The terminal unit 20 is covered on the outer peripheral region thereof with a rubber material 35 to provide shock resistance, water resistance and an improved feel.

As shown in FIG. 8B, the terminal unit 20 is also provided on the back face thereof with a pair of projections 21 arranged near the bottom end of the terminal unit 20, and a pair of recesses 29 arranged near the top end of the terminal unit 20. The rubber material 35 does not extend over most of the front and back faces, and thus over the projections 21. The projections 21 are adapted to be slidably engaged with the respective guide rails 23 of the adapter 22, and the recesses 29 are adapted to be securely engaged with the respective protrusions 24 of the guide rails 23 of the adapter 22, as described in detail below. The illustrated outer profile of the terminal unit 20, in which a top area including the display 20b is wider than a bottom area including the keyboard 20a, can facilitate the handling of the terminal unit 20 both when data is input and when the unit 20 is mounted on the adapter 22.

When the terminal unit 20 is mounted on the adapter 22, the terminal unit 20 is first placed on the base housing 22a of the adapter 22 with the back face of the unit 20 confronting the front surface 22b of the housing 22a, and the projections 21 of the terminal unit 20 are slidably engaged with the respective guide rails 23 of the adapter 22. Then, the terminal unit 20 is slid on the front surface 22b of the base housing 22a so as to insert the bottom end of the unit 20 into the receptive space 22c defined on the adapter 22. During this sliding operation, the terminal unit 20 is suitably guided in a longitudinal direction on the front surface 22b toward the receptive space 22c by a sliding interengagement between the projections 21 and the guide rails 23. As a result, the terminal unit 20 is securely held in a proper position regarding an X-direction on the front surface 22b (see FIGS. 4B and 4C).

Further, the adapter 22 is dimensioned so that the distance between the opposed side walls 26 provided on the base housing 22a is slightly larger than the lateral size of the terminal unit 20, and that the inner profile of each side wall 26 is slightly larger than the outer profile of the lateral end portion, i.e., of the rubber material 35, of the terminal unit 20. Consequently, during the above sliding operation, the inner surface of each side wall 26 is maintained to be spaced from the outer surface of the rubber material 35 through a small gap defined therebetween, while only the free edge 26a of the side wall 26 is brought into slidable contact with a portion of the front face of the terminal unit 20, on which no rubber material 35 is provided (see FIG. 4C).

Therefore, in the adapter 22, it is possible to slide the terminal unit 20 on the front surface 22b by a relatively small force and it is not required to overcome a relatively large friction force caused due to the contact between the side walls 26 and the rubber material 35 of the terminal unit 20 to locate the unit 20 in a proper position. It should be noted that the small gap defined between the side walls 26 and the rubber material 35 also serves to prevent the terminal unit 20 from being damaged by the side walls 26 when the unit 20 is mounted on the adapter 22.

When the terminal unit 20 is appropriately received in the adapter 22, the protrusions 24 formed on the guide rails 23 of the adapter 22 are fitted into the respective recesses 29 formed, on the back face of the unit 20, generally at the end of the sliding operation. At this time, the terminal unit 20 is securely held in a proper position regarding a Y-direction on the front surface 22b (see FIGS. 4B and 5), by an interengagement between the recesses 29 and the protrusions 24. In this respect, the bottom end of the terminal unit 20 may be abutted onto or slightly spaced from the inner surface 27a of the bottom wall 27.

Also, the terminal unit 20 is securely held in a proper position regarding a Z-direction on the front surface 22b (see FIGS. 4C and 5), by an abutment between the front face portion with no rubber material of the unit 20 and the free edges 26a of the side walls 26, as well as by an abutment between the back face of the unit 20 and the guide rails 23 or between the projections 21 of the unit 20 and the front surface 22b. In this manner, the terminal unit 20 is securely held in a proper position on the front surface 22b of the adapter 22, irrespective of the direction of gravity applied to the terminal unit 20.

Figure 6A:
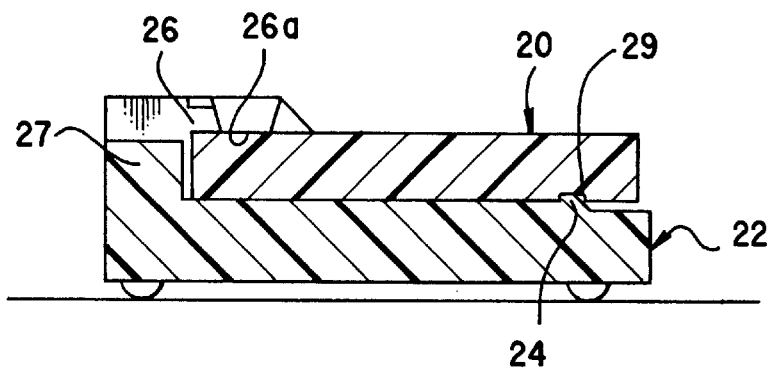
FIG. 6A is a schematically sectional side view taken along line VI—VI in FIG. 4C, with the adapter being partially modified.
Figure 6B:
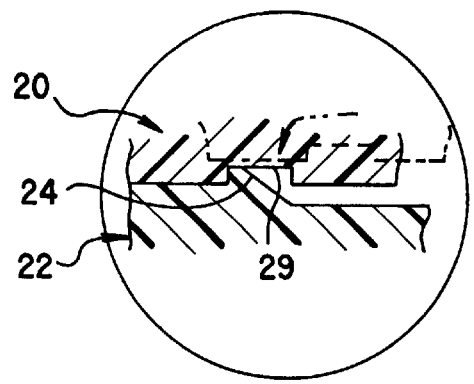
FIG. 6B is an enlarged partial sectional view of the adapter and the terminal unit of FIG. 6A.

FIG. 6A shows the adapter 22 placed horizontally on a flat surface, which is not provided with the foot 28. As mentioned above, even in such a horizontal arrangement of the adapter 22, the terminal unit 20 is securely held in a proper position on the front surface 22b of the adapter 22, where the optical interface 20c and the contact elements 33 of the unit 20 are respectively aligned with and optically/electrically connected to the optical interface 27b and the contact elements 30 of the adapter 22. Further, as shown in FIG. 6B, the adapter 22 of the present invention can provide another advantageous effect in that the protrusions 24 click into the recesses 29 in the sliding operation of the terminal unit 20 along the guide rails 23, which enables an operator to sense that the terminal unit 20 has been correctly mounted and located in a proper position on the adapter 22.

Figure 7A:
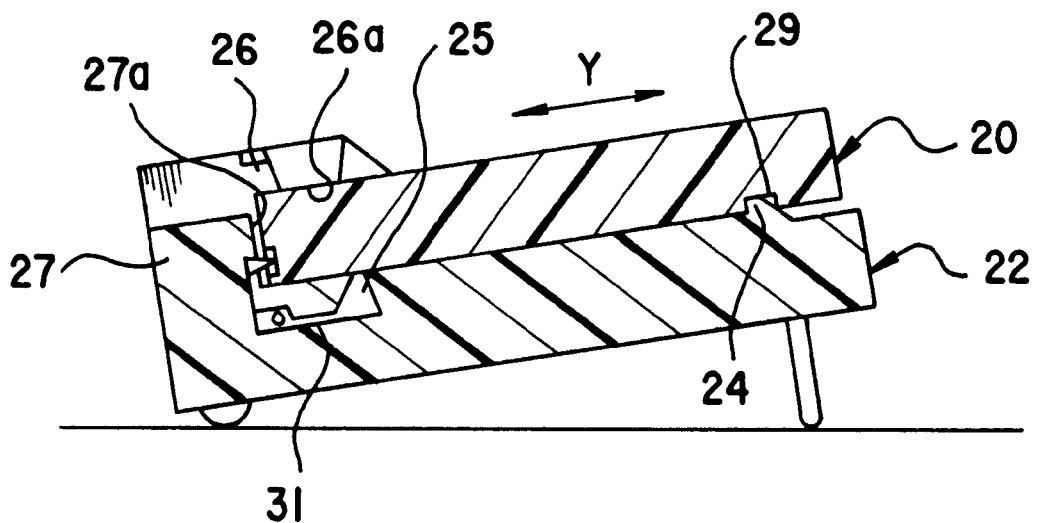
FIG. 7A is a schematically sectional side view taken along line VI—VI in FIG. 4C, showing another feature of the adapter.

FIGS. 7A and 7B show the other characteristic feature of the adapter 22 of the first embodiment. The adapter 22 includes a pair of L-shaped levers 31, the generally triangular first ends 25 of which can project outside through the wall of the base housing 22a from the guide rails 23, as already described (only one lever 31 is shown in FIGS. 7A and 7B). Each lever 31 is pivoted at generally the center corner thereof through a pin 32 to the base housing 22a, while being biased in a counterclockwise direction in the drawings by a spring (not shown). A pin-shaped contact element 30 is fixed to a second end of the lever 31, and is arranged to be capable of projecting through the opening 27c formed in the inner surface 27a of the bottom wall 27. When the terminal unit 20 is not placed on the front surface 22a of the adapter, or is not fully inserted into the receptive space 22c on the adapter 22, the first end 25 of the lever 31 projects from the guide rails 23, and the contact element 30 is retracted inside the bottom wall 27 for protection (shown by a chain line in FIG. 7B).

When the terminal unit 20 is fully inserted into the receptive space 22c on the adapter 22 in a direction of arrow A in FIG. 7B, the first end 25 of the lever 31 is pushed down into the base housing 22a by the terminal unit 20, so that the lever 31 rotates in a clockwise direction, and thereby the contact element 30 emerges from the opening 27c of the bottom wall 27. Consequently, when the terminal unit 20 is received in the proper position in the adapter 22, the contact element 30 of the adapter comes into contact with the contact element 33 of the terminal unit 20 and is maintained in this state, to permit a built-in battery (not shown) of the unit 20 to be charged. According to this arrangement, the adapter 22 can prevent the pin-shaped contact element 30 from being damaged or broken by the terminal unit 20 during the mounting operation of the unit 20 on the adapter 22.

In addition to this arrangement, a switch mechanism 34 may be advantageously provided for detecting that the terminal unit 20 is received in a proper position in the adapter 22 and for activating a charging system (not shown) of the adapter 22. The switch mechanism 34 may be disposed adjacent to the first end 25 of the lever 31 to be actuated by the pivoting motion of the lever 31.

Figure 9:
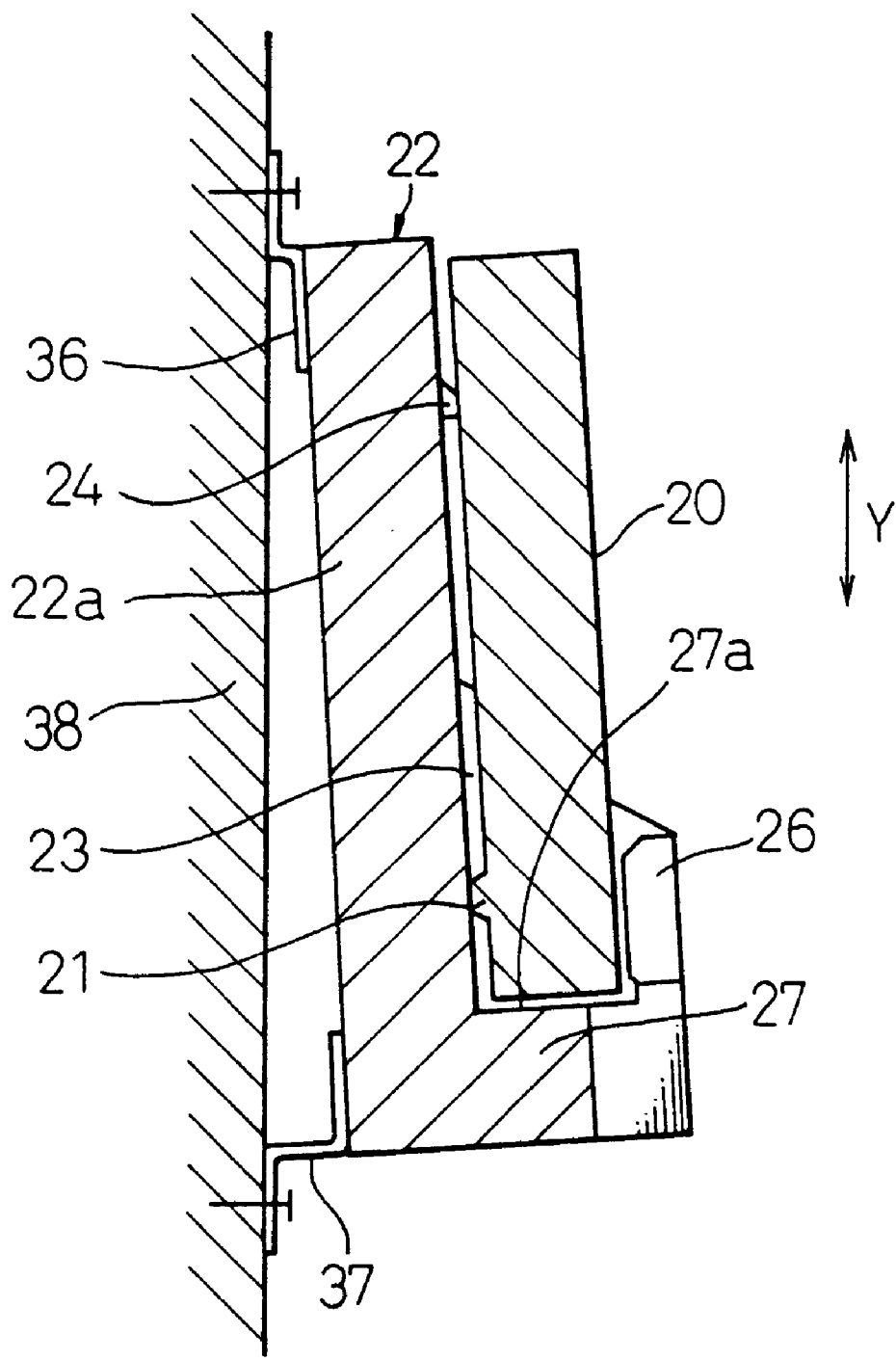
FIG. 9 is a schematically sectional side view showing a second embodiment of an adapter according to the present invention, with a terminal unit being received in the adapter.

FIGS. 9 and 10 show an adapter according to the second embodiment of the present invention. The adapter 22 of the second embodiment is generally similar to that of the first embodiment, except that the foot 28 in the first embodiment is replaced with attachments 36 and 37 for enabling the adapter 22 to be attached or fixed to an upstanding wall 38. A detailed description of the similar or identical features are not repeated. In this arrangement, it is preferred that the attachment 37 secured near the bottom edge of the back side of the base housing 22a is longer than the attachment 36 secured near the top edge of the back side of the base housing 22a, to permit the adapter 22 to be placed with a certain inclination on the upstanding surface in such a manner at the bottom edge of the mount or front surface 22b is higher than the top edge of the latter from the upstanding surface.

In the adapter 22 of the second embodiment, the terminal unit 20 can also be easily received and securely held in a proper position on the front surface 22b of the base housing 22a, in the same manner as already mentioned in connection with the first embodiment. In this respect, a certain modifications may be made in the second embodiment, in that, as shown in FIG. 10, the guide rails 23 for engagement with the projections 21 of the terminal unit 20 are shorter because the sliding operation for inserting the terminal unit 20 into the receptive space 22c on the adapter 22 is normally smaller in the upstanding wall application of the second embodiment, in comparison with the horizontal table application of the first embodiment. Also, additional protrusions 24' may be provided on the front surface 22b of the base housing 22a, for assisting the function of the protrusions 24 to securely hold the terminal unit 20 in a proper position regarding a Y-direction on the front surface 22b.

FIG. 10 also shows an output or input connector 22e provided on the top end of the base housing 22a of the adapter 22, which is adapted to be joined with a cable (not shown) for electrically or optically connecting the adapter 22 to the host computer or to a power source (not shown). Of course, it is possible to transmit data from the adapter 22 to the host computer by radio communication.

Figure 11:
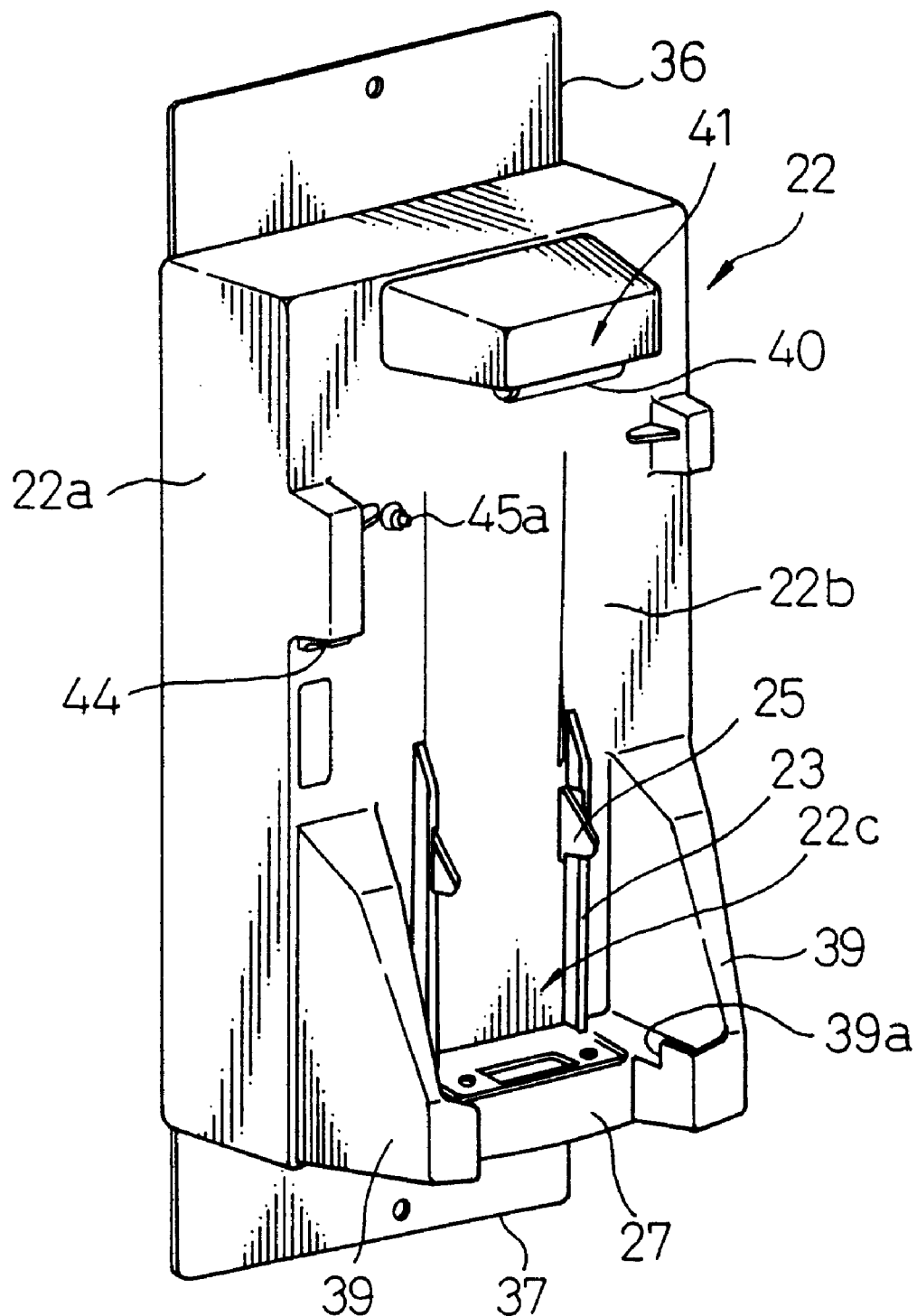
FIG. 11 is a perspective view showing a third embodiment of an adapter according to the present invention.
Figure 12:
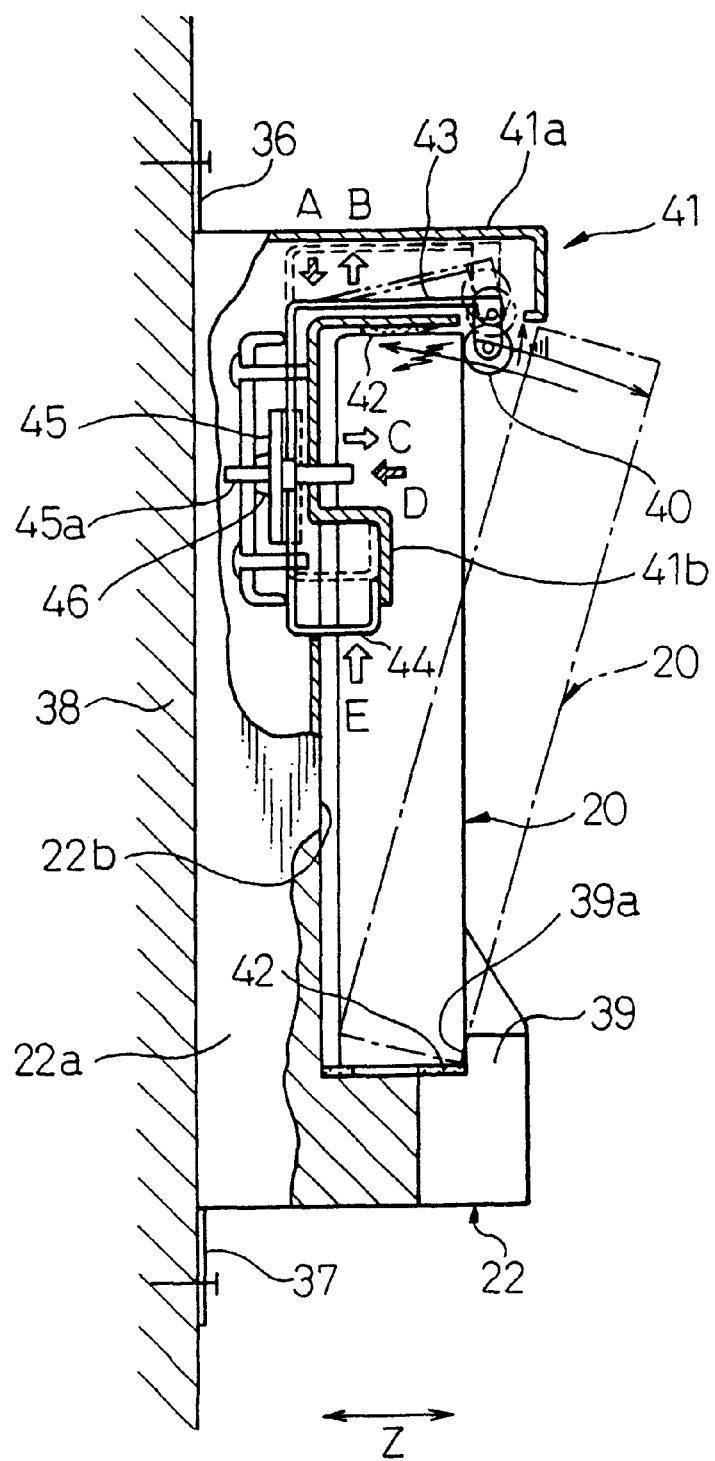
FIG. 12 is a partially sectional side view of the adapter of FIG. 11, schematically illustrating a terminal unit in received and detached positions.

FIGS. 11 and 12 show an adapter according to the third embodiment of the present invention. The adapter 22 of the third embodiment is generally similar to that of the second embodiment, except for the provision of a supporting mechanism 41 for releasably supporting the terminal unit 20 in a proper position and of shock absorbing elements 42 for reducing the shock applied to the terminal unit 20. A detailed description of the similar or identical features are not repeated. The adapter 22 of the third embodiment may be mounted on an interior surface of a vehicle.

As shown in FIG. 11, the adapter 22 of the third embodiment may be fixed to, an upstanding wall 38, or any other wall, in various positions by the attachments 36 and 37 partially modified in the configuration thereof from those of the second embodiment. Also, the adapter 22 of the third embodiment includes two side walls 39 partially modified in the configuration thereof from the side walls 26 of the first or second embodiment. The side walls 39 are provided along the respective side edges of the mount or front surface 22b of the base housing 22a to project from the front surface 22b, and are connected to the bottom wall 27 to define a receptive space 22c for receiving the terminal unit 20 between the inner surfaces of the walls 39, 27 and the front surface 22b.

Each side wall 39 is provided with a relatively small guide plate, having a free edge 39a thereof, which integrally extends from the free end of the side wall 39 into the receptive space 22c. The side walls serve to securely hold the terminal unit 20 in a proper position regarding a Z-direction on the front surface 22b, by an abutment between the front face portion of the unit 20 and the free edges 39a of the side walls 39. However, the side walls 39 are not normally required to slidingly guide the terminal unit 20 by the free edges 39a thereof, because the unit 20 is not slidingly inserted into the receptive space 22c, but mounted on the base housing 22a by a pivot motion as described below.

As shown in FIG. 12, the supporting mechanism 41 includes an L-shaped plate 43 shiftably supported in the base housing 22a, a rolling element 40 rotatably carried on one end of the plate 43, a push part 44 formed on another end of the plate 43, and a stopper 45 shiftably supported in the base housing 22a adjacent to the plate 43. The rolling element 40 is disposed within a top wall 41a formed along the top edge of the front surface 22b of the base housing 22a and opposite to the bottom wall 27. The push part 44 is disposed within a lateral wall 41b formed along the side edge of the front surface 22b of the base housing 22a. The plate 43 is biased in a direction A toward the bottom wall 27 by a spring (not shown) and, in the normal state, the plate 43 is located in an operative posit-on wherein the rolling element 40 and the push part 44 project from the top wall 41a and the lateral wall 41b, respectively (shown by a solid line in FIG. 12).

The stopper 45, preferably formed by a circular disk, includes a shaft 45a and is biased in a direction C toward the front surface 22b by a spring 46. In the normal state, the stopper 45 is abutted onto the plate 43 under the biasing force of the spring 46. The plate 43 is provided with an opening (not shown) for receiving the stopper 45 when the plate 43 is brought into a retracted position (shown by a broken line in FIG. 12). The shock absorbing elements or sheets 42 are affixed respectively on the mutually opposing surfaces of the bottom wall 27 and the top wall 41a.

In the third embodiment, the terminal unit 20 is mounted on the adapter 22 in the following manner. First, an operator pushes the push part 44 into the lateral wall 41b in a direction B against the biasing force, to shift the plate 43 from the operative position to the retracted position, and to retract the rolling element 40 within the top wall 41a. When the plate 43 reaches the retracted position, the stopper 45 is received in the opening of the plate 43, to secure the plate 43 in the retracted position, and one end of the shaft 45a projects from the front surface 22b of the base housing 22a.

The operator inserts the bottom end of the terminal unit 20 into the receptive space 22c in the adapter 22, and places the unit 20 between the bottom wall 27 and the top wall 41a on the front surface 22b of the base housing 22a. During this operation, the back face of the terminal unit 20 is abutted to the projecting end of the shaft 45a to push the stopper 45 out of the opening of the plate 43 in a direction D against the force of the spring 46. When the terminal unit 20 is received in a proper position in the adapter 22, the stopper 45 is fully disengaged from the plate 43, whereby the plate 43 is shifted back in the direction A and the rolling element 40 projects from the top wall 41a.

Consequently, in the proper position, the terminal unit 20 is securely supported in the Z-direction by the cooperation between the rolling element 40 of the supporting mechanism 41, the free edges 39a of the side walls 39 and the front surface 22b of the base housing 22a. Also, in the proper position, the terminal unit 20 is securely held between the bottom wall 27 and the top wall 41a through the respective interposition of the shock absorbing elements 42. Accordingly, it is possible to stably and securely support the terminal unit 20 in the proper position in the adapter 22 even when the adapter 22 is placed in a location subject to significant vibration, such as the interior of a vehicle.

The terminal unit 20 can be detached from the adapter 22 simply by pushing again the push part 44 of the plate 43 (as shown by an arrow E) to shift the plate 43 into the retracted position and to release the interengagement between the rolling element 40 and the unit 20.

In a modification of the third embodiment, the plate 43 may be advantageously made from a plate spring. In this modification, it is possible to mount the terminal unit 20 in the proper position in the adapter 22, even when the lever 43 is left in the operative position and thus the rolling element 40 is left projecting from the top wall 41a, because the lever 43 can be easily and elastically deflected or retracted into the top wall 41a (as shown by a chain line in FIG. 12) by forcing the unit 20 toward the front surface 22b. Also, it is possible to detach the terminal unit 20 from the adapter 22, even when the lever 43 is left in the operative position and the rolling element 40 is left projecting from the top wall 41a, by forcing the unit 20 away from the front surface 22b to elastically deflect the rolling element 40 into the top wall 41a. Therefore, the modification enables a one-hand operation for mounting the terminal unit 20 on the adapter 22 and for detaching the unit 20 from the adapter 22.

While the invention has been particularly shown and described with reference to preferred embodiments thereof, it will be understood by those skilled in the art that various changes and modifications may be made without departing from the spirit and scope of the invention. For example, the present invention may be embodied as various adapter systems other than the communication adapter system mentioned above, such as a battery charging adapter system permitting an electrical unit to be charged through an adapter by a power source. In any event, the scope of the invention is to be determined solely by the appended claims.

What is claimed is:

1. An adapter, for a terminal unit, comprising:
   a base housing having a mount surface for mounting a terminal unit;
   a plurality of side walls, extending from a longitudinally midway portion of said mount surface to a bottom edge thereof provided on said base housing to define a receptive space on a part of said mount surface of said base housing;
   an interface section provided on said base housing for connection with the terminal unit; and
   an edge formed on at least one of said walls, for guiding a front face of the terminal unit to introduce a part of the terminal unit into said receptive space, and for detachably holding the terminal unit between said edge and said mount surface to maintain said connection; and at least one guide rail formed on said mount surface of said base housing, between, and offset from said side walls, projecting from said mount surface, said guide rail arranged to be slidably engaged with a back face of the terminal unit.

2. An adapter, for a terminal unit, comprising:

a base housing having a mount surface for mounting a terminal unit;

a plurality of side walls, extending from a longitudinally midway portion of said mount surface to a bottom edge thereof provided on said base housing to define a receptive space on a part of said mount surface of said base housing;

an interface section provided on said base housing for connection with the terminal unit;

an edge formed on at least one of said walls, for guiding a front face of the terminal unit to introduce a part of the terminal unit into said receptive space, and for detachably holding the terminal unit between said edge and said mount surface; and at least one guide rail formed on said mount surface of said base housing, projecting from said mount surface, between, and offset from said side walls said guide rail arranged to be slidably engaged with a back face of the terminal unit;

wherein said edge faces said mount surface and is arranged to be slidably engaged with the front face of the terminal unit.

3. An adapter, as claimed in claim 1, farther comprising at least one protrusion formed on said mount surface, said protrusion being arranged to be engaged with the back face of the terminal unit.

4. An adapter, for a terminal unit, comprising:

a base housing having a mount surface for mounting a terminal unit;

a plurality of walls provided on said base housing to define a receptive space on a part of said mount surface of said base housing;

an interface section provided on said base housing for connection with the terminal unit;

an edge formed on at least one of said walls, for guiding a front face of the terminal unit to introduce a part of the terminal unit into said receptive space, and for detachably holding the terminal unit between said edge and said mount surface; and a supporting mechanism detachably supporting the terminal unit on said mount surface, said supporting mechanism including an additional wall arranged opposite to said receptive space on said mount surface and a rolling element retractably projecting toward said receptive space from said additional wall.

5. An adapter, as claimed in claim 4, wherein said supporting mechanism further includes a shiftable member arranged within said base housing, said shiftable member carrying at one end thereof said rolling element in a rotatable manner and at another end thereof a push part accessively disposed on said base housing.

6. An adapter, as claimed in claim 5, wherein said shiftable member is made from a plate spring.

7. An adapter, as claimed in claim 4, wherein said supporting mechanism further includes shock absorbing elements affixed respectively onto mutually opposed surfaces of said additional wall and one of said walls.

8. An adapter, as claimed in claim 1, wherein said interface section includes an optical interface for communication.

9. An adapter, as claimed in claim 1, wherein said interface section includes a battery charging contact.

10. An adapter, as claimed in claim 9, wherein said battery charging contact is retractably arranged in one of said walls defining said receptive space, and wherein a lever, carrying at one end thereof said battery charging contact, is pivotably supported within said base housing, said lever having another end retractably projecting from said mount surface when said battery charging contact is retracted into said one wall.

11. An adapter, as claimed in claim 10, further comprising a switch mechanism arranged in said base housing for detecting a placement of the terminal unit, said switch mechanism being actuated by said lever.

12. A connecting structure comprising an adapter and a terminal unit, wherein said terminal unit includes:

a body, a data input section accessively provided on said body;

an interface section provided on said body separately from said data input section; and a protective cover attached to an outer peripheral area of said body; and wherein said adapter includes:

a base housing having a mount surface;

a plurality of side walls, extending from a longitudinally midway portion of said mount surface to a bottom edge thereof, provided on said base housing to define a receptive space on a part of said mount surface of said base housing;

at least one guide rail formed on said mount surface of said base housing, between and offset from said side walls, projecting from said mount surface, said guide rail arranged to be slidably engaged with a back face of the terminal unit;

an interface section provided on said base housing to provide connection with said interface section of said terminal unit;

an edge formed on at least one of said side walls to be slidably engaged with a portion outside of said protective cover of said base of said terminal unit, for guiding a front face of said terminal unit to introduce a part of said terminal unit into said receptive space, and for detachably holding said terminal unit; and a switch mechanism arranged in said base housing for detecting a placement of the terminal unit in a predetermined position.

13. An adapter, as claimed in claim 3, wherein a surface of another one of said walls is arranged to be abutted with the terminal unit to hold the terminal unit in cooperation with said protrusion.

14. A connecting structure comprising an adapter and a terminal unit, wherein said terminal unit includes:

a body;

a data input section accessively provided on said body;

an interface section provided on said body separately from said data input section; and a protective cover attached to an outer peripheral area of said body; and wherein said adapter includes;

a base housing having a mount surface;

a plurality of side walls, extending from a longitudinally midway portion of said mount surface to a bottom edge thereof provided on said base housing to define a receptive space on a part of said mount surface of said base housing;

guide means arranged to be slidably engaged with a portion, separated from said protective cover, of said base of said terminal unit, for guiding said terminal unit to introduce a part of said terminal unit into said receptive space;

an interface section provided on said base housing to provide connection with said interface section of said terminal unit; and holding means for detachably holding said terminal unit in a predetermined position on said mount surface to maintain said connection.

15. An adapter, as claimed in claim 12, wherein said switch mechanism includes an actuating lever pivotably supported within said base housing for actuating said switch mechanism, said actuating lever having one end capable of retractably projecting from said mount surface.

* * * * *

UNITED STATES PATENT AND TRADEMARK OFFICE
CERTIFICATE OF CORRECTION

PATENT NO. : 6,290,529 B1
DATED : September 18, 2001
INVENTOR(S) : Tsurumaru et al.

Page 1 of 1

It is certified that error appears in the above-identified patent and that said Letters Patent is hereby corrected as shown below:

<u>Title page,</u>
Item [73], please add -- Fujitsu Kiden Ltd., Inagi, Japan --

Signed and Sealed this

Twenty-second Day of January, 2002

Attest:

Attesting Officer

JAMES E. ROGAN
*Director of the United States Patent and Trademark Office*